United States Patent
Kim et al.

(10) Patent No.: US 11,616,381 B2
(45) Date of Patent: Mar. 28, 2023

(54) ELECTRONIC DEVICE AND METHOD FOR LENGTHENING BATTERY LIFE

(71) Applicant: Samsung Electronics Co., Ltd., Suwon-si (KR)

(72) Inventors: Hojong Kim, Suwon-si (KR); Dongwoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 16/870,735

(22) Filed: May 8, 2020

(65) Prior Publication Data
US 2020/0358296 A1 Nov. 12, 2020

(30) Foreign Application Priority Data

May 10, 2019 (KR) .................. 10-2019-0054877

(51) Int. Cl.
*H02J 7/00* (2006.01)
*H01M 10/44* (2006.01)
*H01M 10/48* (2006.01)

(52) U.S. Cl.
CPC .......... *H02J 7/007* (2013.01); *H01M 10/441* (2013.01); *H02J 7/0013* (2013.01); *H02J 7/0029* (2013.01);
(Continued)

(58) Field of Classification Search
CPC ........ H02J 7/007; H02J 7/0029; H02J 7/0013; H01M 10/443; H01M 10/486; H01M 10/441
(Continued)

(56) References Cited

U.S. PATENT DOCUMENTS

| 10,211,652 B2 | 2/2019 | Kwon et al. |
| 2012/0161714 A1* | 6/2012 | Ishibashi ............... H02J 7/0025 320/135 |

(Continued)

FOREIGN PATENT DOCUMENTS

| JP | 2004-222473 A | 8/2004 |
| JP | 2016144256 A | 8/2016 |

(Continued)

OTHER PUBLICATIONS

International Search Report dated Aug. 25, 2020 in connection with International Patent Application No. PCT/KR2020/006094, 3 pages.

(Continued)

*Primary Examiner* — Edward Tso
*Assistant Examiner* — Aaron Piggush

(57) ABSTRACT

An electronic device includes a first battery, a second battery, a power management integrated circuit, a memory, and a processor. The memory is configured to store information on a first full-charging voltage value of the first battery and a second full-charging voltage value of the second battery. The processor is configured to detect whether the electronic device is connected to an external electronic device for supplying power to the first battery or the second battery. When the first full-charging voltage value is higher than the second full-charging voltage value the processor is configured to, electrically connect the first battery to the power management integrated circuit and electrically disconnect the second battery from the power management integrated circuit. The processor is further configured to charge the first battery electrically connected to the power management integrated circuit based on power obtained from the external electronic device.

20 Claims, 10 Drawing Sheets

(52) U.S. Cl.
CPC ........ *H01M 10/443* (2013.01); *H01M 10/486* (2013.01)

(58) Field of Classification Search
USPC ................. 320/106, 114, 119, 124, 134, 163
See application file for complete search history.

(56) References Cited

U.S. PATENT DOCUMENTS

| | | | |
|---|---|---|---|
| 2013/0113417 A1* | 5/2013 | Nakashima | H02J 7/0019 320/162 |
| 2014/0239964 A1 | 8/2014 | Gach et al. | |
| 2015/0155720 A1 | 6/2015 | Mise et al. | |
| 2016/0001719 A1 | 1/2016 | Frost et al. | |
| 2017/0005489 A1* | 1/2017 | Kwon | H02J 7/342 |
| 2018/0203070 A1 | 7/2018 | Park | |

FOREIGN PATENT DOCUMENTS

| | | |
|---|---|---|
| KR | 10-2017-0003081 A | 1/2017 |
| KR | 10-2017-0052340 A | 5/2017 |
| KR | 10-2018-0085165 A | 7/2018 |

OTHER PUBLICATIONS

Written Opinion of the International Searching Authority dated Aug. 25, 2020 in connection with International Patent Application No. PCT/KR2020/006094, 4 pages.

European Patent Office, "Supplementary European Search Report," dated Jun. 8, 2022, in connection with European Patent Application No. 20806344.6, 8 pages.

\* cited by examiner

ELECTRONIC DEVICE AND METHOD FOR LENGTHENING BATTERY LIFE

CROSS-REFERENCE TO RELATED APPLICATION

This application is based on and claims priority under 35 U.S.C. 119 to Korean Patent Application No. 10-2019-0054877 filed on May 10, 2019 in the Korean Intellectual Property Office, the disclosure of which is herein incorporated by reference in its entirety.

BACKGROUND

1. Field

The disclosure relates to an electronic device for lengthening a battery life and an operation method thereof.

2. Description of Related Art

An electronic device may be supplied with power from a rechargeable battery. The electronic device may include a power management integrated circuit (PMIC) for managing a battery. The electronic device may include a plurality of batteries. The plurality of batteries of the electronic device may be independently charged and discharged.

The above information is presented as background information only to assist with an understanding of the disclosure. No determination has been made, and no assertion is made, as to whether any of the above might be applicable as prior art with regard to the disclosure.

SUMMARY

An electronic device may be supplied with power from rechargeable batteries. The rechargeable batteries of the electronic device may have different lives from each other. Accordingly, a solution for relieving a life difference between batteries by selecting batteries, which are to be primarily charged and/or used in an electronic device, from among batteries having different lives from each other may be required.

Technical tasks of the disclosure are not limited to the aforementioned task, and other unmentioned technical tasks will be clearly understood from the following description by those skilled in the art to which the disclosure belongs.

An electronic device according to an embodiment may include: a first battery; a second battery; a power management integrated circuit; a memory configured to store information on a first full-charging voltage value of the first battery which is fully charged and a second full-charging voltage value of the second battery which is fully charged; and a processor, wherein the processor is configured to: detect whether or not the electronic device is connected to an external electronic device for supplying power to the first battery or the second battery; in response to the detection, when it is identified that the first full-charging voltage value is higher than the second full-charging voltage value, electrically connect the first battery to the power management integrated circuit and electrically disconnect the second battery from the power management integrated circuit; and charge, on the basis of power obtained from the external electronic device, the first battery electrically connected to the power management integrated circuit.

A method for operating an electronic device according to an embodiment may include: detecting whether or not the electronic device is connected to an external electronic device for supplying power to a first battery or a second battery; in response to the detection, electrically connecting the first battery to a power management integrated circuit and electrically disconnecting the second battery from the power management integrated circuit, on the basis of a first full-charging voltage value of the first battery which is fully charged, the first full-charging voltage being stored in a memory, and a second full-charging voltage value of the second battery which is fully charged, the second full-charging voltage value being lower than the first full-charging voltage value; and charging, on the basis of power obtained from the external electronic device, the first battery electrically connected to the power management integrated circuit.

An electronic device according to an embodiment may include: a first battery; a second battery; a memory configured to store information on a first full-charging voltage value of the first battery which is fully charged and a second full-charging voltage value of the second battery which is fully charged, the second full-charging voltage value being lower than the first full-charging voltage value; a power management integrated circuit configured to be electrically connected to the first battery through a first current limiting circuit and to be electrically connected to the second battery through a second current limiting circuit; and a processor, wherein the processor is configured to: detect whether or not the electronic device is connected to an external electronic device; in response to the detection, supply, on the basis of the proportion of the first full-charging voltage value to the first full-charging voltage value and the second full-charging voltage value, a part of power obtained from the external electronic device to the first battery; and in response to the detection, supply, on the basis of the proportion of the second full-charging voltage value to the first full-charging voltage value and the second full-charging voltage value, the remainder of the power obtained from the external electronic device to the second battery.

An electronic device and an operation method thereof according to an embodiment may determine, on the basis of respective full-charging voltage values of two rechargeable batteries, a battery which is to be used first, thereby enabling the two rechargeable batteries of the electronic device to have lives equivalent to each other.

An electronic device and an operation method thereof according to an embodiment may control two rechargeable batteries of the electronic device to enable the batteries to have lives equivalent to each other, thereby extending the lives of the batteries included in the electronic device.

An electronic device and an operation method thereof according to an embodiment may electrically disconnect, when one battery of two rechargeable batteries of the electronic device is charged or used, the other battery of the two rechargeable batteries from other components of the electronic device, thereby preventing supplementary charging between the two rechargeable batteries.

Effects obtainable from the disclosure are not limited to the aforementioned effects, and other unmentioned effects will be clearly understood from the following description by those skilled in the art to which the disclosure belongs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
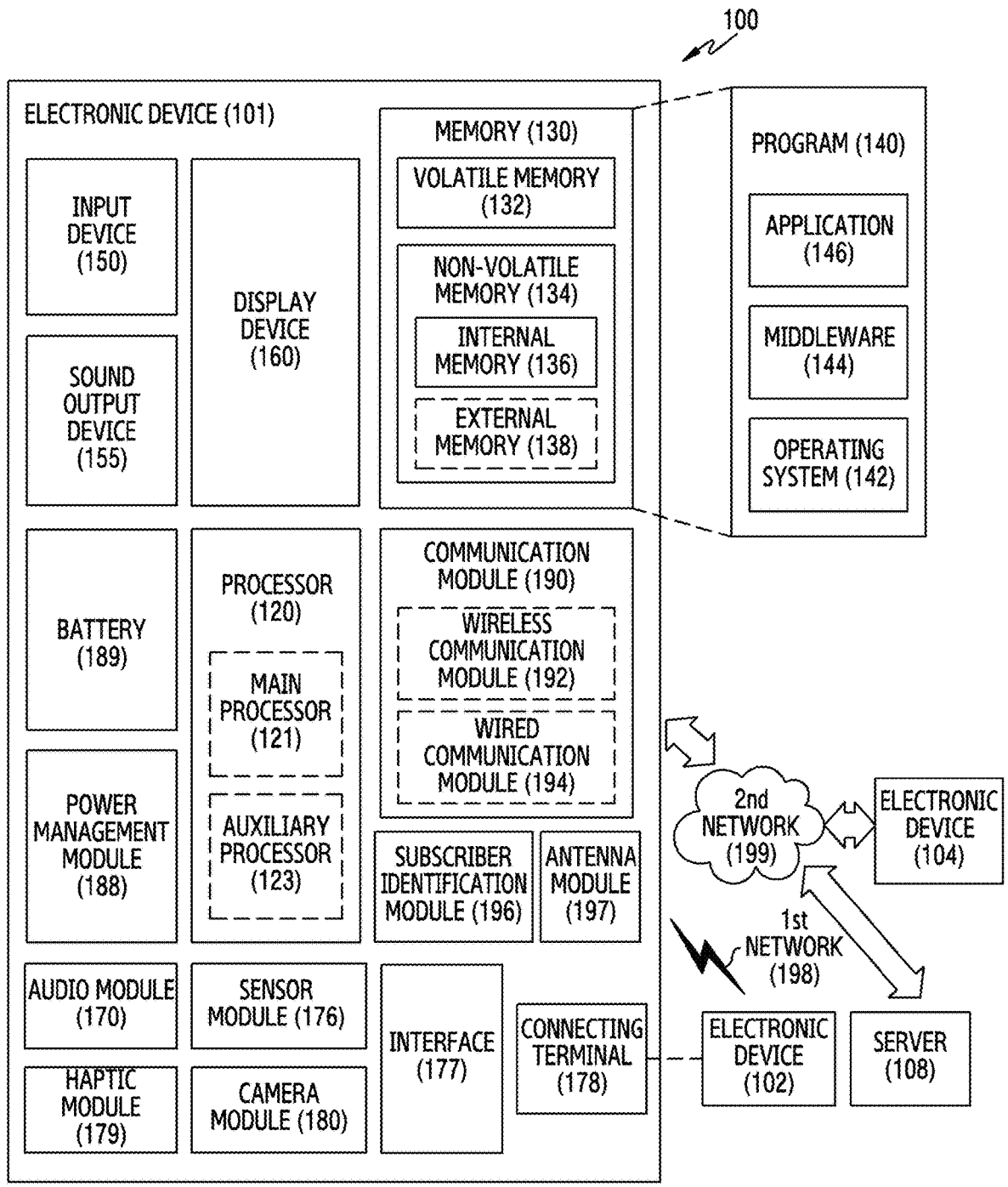
FIG. 1 illustrates a block diagram of an electronic device in a network environment according to an embodiment.

FIG. 1 illustrates a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
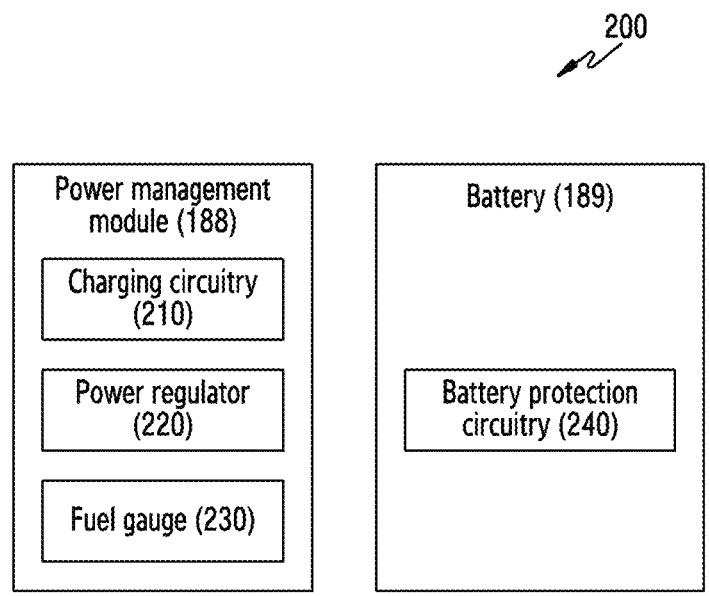
FIG. 2 illustrates a block diagram relating to a power management module and a battery of an electronic device according to an embodiment.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
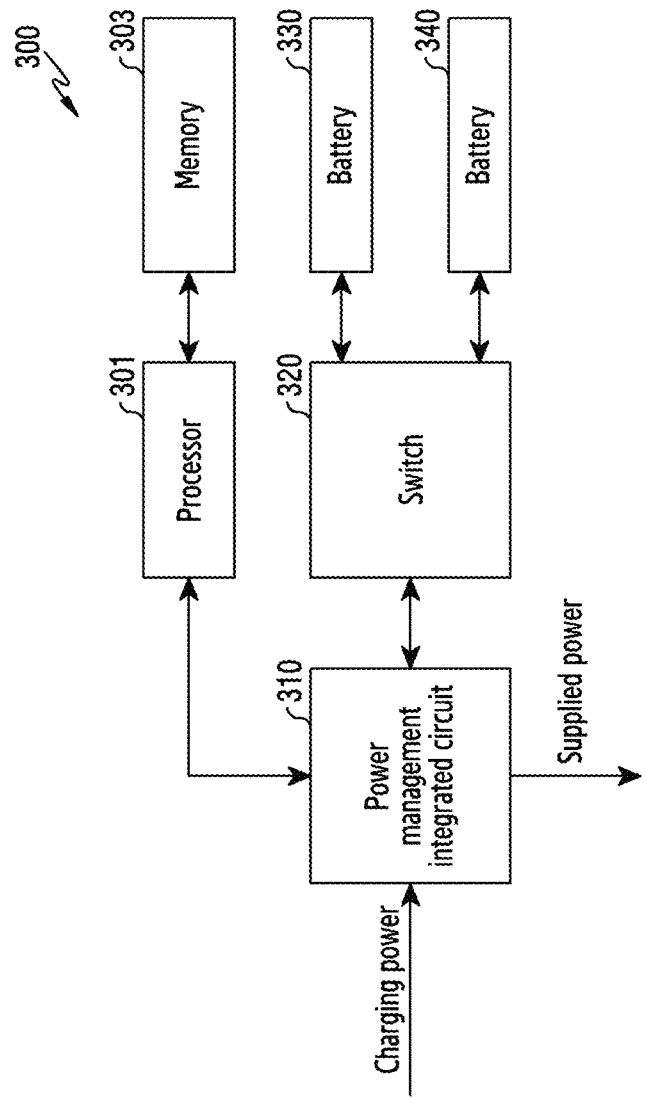
FIG. 3 illustrates a block diagram relating to a power management integrated circuit, current limiting circuits, and batteries of an electronic device according to an embodiment.

FIG. 3 illustrates a block diagram 300 relating to a processor 301, a memory 303, a power management integrated circuit 310, a switch 320, and batteries 330, 340 of an electronic device (for example: an electronic device 101) according to an embodiment. The processor 301 illustrated in FIG. 3 may correspond to a processor 120 illustrated in FIG. 1. The memory 303 illustrated in FIG. 3 may correspond to a memory 130 illustrated in FIG. 1. The power management integrated circuit 310 may correspond to a power management module 188 illustrated in FIG. 1 or a power management module 188 illustrated in FIG. 2. Each of the batteries 330, 340 illustrated in FIG. 3 may correspond to a battery 189 illustrated in FIG. 1 or a battery 189 illustrated in FIG. 2.

In an embodiment, each of the batteries 330, 340 may have at least one state of a battery charging state, a battery using state, or a battery full-discharged state. In an embodiment, a battery charging state may be a state where external charging power is supplied to a battery (for example: a first battery 330). In an embodiment, a battery using state may be a state where power is supplied to the outside from a battery (for example: a first battery 330). In an embodiment, a battery full-discharged state may be a state where the voltage of a battery (for example: a first battery 330) may be equal to or less than a configured voltage (for example: 3.6 volt (V)).

In an embodiment, a battery charging state may be divided into at least four states (for example: a pre-charging state, a constant-current charging state, a constant-voltage charging state, and a charging end state). In an embodiment, a charging end state may be referred to as a full-charged state. In an embodiment, a voltage value at the time when a battery (for example: a first battery 330) is fully charged may be referred to as a full-charging voltage value. In an embodiment, a full-charging voltage value may be a voltage value indicated by a battery (for example: a first battery 330) directly after a state of the battery (for example: the first battery 330) is changed from a constant-voltage charging state to a full-charged state. In an embodiment, a voltage value of a battery (for example: a first battery 330) may be measured through a power gauge (for example: a power gauge 230 of FIG. 2). In an embodiment, a pre-charging state may be a state for limiting the current of power supplied to a battery (for example: a first battery 330) to a configured pre-charging current, when the battery (for example: the first battery 330) has a voltage equal to or less than a configured pre-charging voltage. In an embodiment, a constant-current charging state may be a state for limiting the current of power supplied to a battery (for example: a first battery 330) to a configured constant current, when the battery (for example: the first battery 330) is pre-charged and the voltage of the battery (for example: the first battery 330) is out of a configured pre-charging voltage range. In an embodiment, a constant-voltage charging state may be a state for limiting the voltage of power supplied to a battery (for example: a first battery 330) to a configured constant voltage, when constant-current charging is performed in the battery (for example: the first battery 330) and the voltage of the battery (for example: the first battery 330) reaches a configured voltage. In an embodiment, a charging end state may be a state for stopping the supply of power to a battery (for example: a first battery 330), when constant-voltage charging is performed in the battery (for example: the first battery 330) and the voltage of the battery (for example: the first battery 330) reaches a configured voltage.

Referring to FIG. 3, a processor 301 of an electronic device (for example: electronic device 101) according to an embodiment may control a power management integrated circuit 310, a switch 320, or a combination thereof. In an embodiment, controlling, by a power management integrated circuit 310, a switch 320 or reading and/or writing, by the power management integrated circuit 310, data stored in a memory 303 may be performed on the basis of controlling, by a processor 301, the power management integrated circuit 310.

In an embodiment, a power management integrated circuit 310 of an electronic device (for example: an electronic device 101) according to an embodiment may initially configure, as a primary battery, one battery (for example: a first battery 330) of two batteries 330 and 340 and initially configure, as a secondary battery, the other battery (for example: a second battery 340), on the basis of respective initial full-charging voltage values of the two batteries 330 and 340, when both two batteries 330 and 340 are initially fully charged. In an embodiment, a power management integrated circuit 310 may configure, as a primary battery, a battery (for example: a first battery 330) having a higher initial full-charging voltage value from among two batteries 330 and 340 and initially configure, as a secondary battery, the other battery (for example: a second battery 340) having a lower initial full-charging voltage value, when both two batteries 330 and 340 are initially fully charged. In an embodiment, respective initial full-charging voltage values of two batteries 330 and 340 may be voltage values measured at a point of time when both two batteries 330 and 340 are initially fully charged.

In an embodiment, a power management integrated circuit 310 may reconfigure a primary battery and a secondary battery on the basis of respective full-charging voltage values of two batteries 330 and 340. In an embodiment, a power management integrated circuit 310 may identify full-charging voltage values of at least one battery of two batteries 330 and 340 every preconfigured points of time and reconfigure a primary battery and a secondary battery on the basis of the identified full-charging voltage values. In an embodiment, a power management integrated circuit 310 may configure, as a primary battery, a battery (for example: a first battery 330) having a higher full-charging voltage value from among two batteries 330 and 340 at the preconfigured points of time and configure, as a secondary battery, the other battery (for example: a second battery 340) having a lower full-charging voltage value. In an embodiment, preconfigured points of time may include at least one point of time of: a point of time when both two batteries 330 and 340 are fully charged; a point of time when at least one battery of two batteries 330 and 340 is fully charged; a point of time when the number of full-charging times of both two batteries 330 and 340 is a reference number of full-charging times (for example: 100*N times, wherein N is a natural number); a point of time when the number of full-charging times of at least one battery of two batteries 330 and 340 is a reference number of full-charging times (for example: 100*N times, wherein N is a natural number); a point of time when in a state where both two batteries 330 and 340 are fully charged, a charge amount of charging power supplied to the two batteries 330 and 340 initially exceeds a reference charge amount (for example: 300*N ampere-hour (Ah), wherein N is a natural number); a point of time when in a state where at least one battery of two batteries 330 and 340 is fully charged, a charge amount of charging power supplied to the at least one battery initially exceeds a reference charge amount (for example: 300*N ampere-hour (Ah), wherein N is a natural number); a point of time when charging cycles of both two batteries 330 and 340 are a reference charging cycle (for example: 100*N times, wherein N is a natural number); or a point of time when a charging cycle of at least one battery of two batteries 330 and 340 is a reference charging cycle (for example: 100*N times, wherein N is a natural number).

In an embodiment, in a case where a charging capacity of a battery (for example: a first battery 330) is 3,000 mAh, when the battery (for example: the first battery 330) is charged in a charge amount of 3,000 mAh, it may be identified that the battery (for example: the first battery 330) is charged in one cycle. In an embodiment, a value obtained by dividing an accumulated charging charge amount of a battery (for example: a first battery 330) by a charging capacity of the battery (for example: the first battery 330) may be identified as a charging cycle. In an embodiment, when a charging capacity of a battery (for example: a first battery 330) is 3,000 mAh and an accumulated charging charge amount of the battery (for example: the first battery 330) is 6,000 mAh, a charging cycle of the battery (for example: the first battery 330) may be identified as two cycles. In an embodiment, a power management integrated circuit 310 may identify full-charging voltage values of a battery (for example: a first battery 330) every points of time when an accumulated charging charge amount of the battery (for example: the first battery 330) exceeds a configured integer multiple (for example: 100 times) of a charging capacity of the battery (for example: the first battery 330), and reconfigure a primary battery and a secondary battery on the basis of the identified full-charging voltage values.

In an embodiment, a power management integrated circuit 310 may store configuration information on a primary battery and configuration information on a secondary battery in a memory 303. In an embodiment, a power management integrated circuit 310 may store respective full-charging voltage values of two batteries 330 and 340 in a memory 303.

In an embodiment, it was exemplified that a power management integrated circuit 310 identifies full-charging voltage values of at least one battery of two batteries 330 and 340 every preconfigured points of time and reconfigures a primary battery and a secondary battery on the basis of the identified full-charging voltage values, but it is merely exemplification. In an embodiment, a power management integrated circuit 310 may identify a full-charging voltage value of at least one battery of two batteries 330 and 340 on the basis of a user input and reconfigure a primary battery and a secondary battery on the basis of the identified full-charging voltage value. In an embodiment, an user input may be identified by a processor 301 of an electronic device 101.

In an embodiment, a power management integrated circuit 310 may control a switch 320. In an embodiment, a power management integrated circuit 310 may be electrically connected to at least one battery (for example: a first battery 330) of two batteries 330 and 340 by controlling a switch 320. In an embodiment, a power management integrated circuit 310 may be electrically disconnected from a remaining battery (for example: a second battery 340) of two batteries 330 and 340 by controlling a switch 320.

In an embodiment, a power management integrated circuit 310 may control a switch 320 so as to change a battery electrically connected to the power management integrated circuit 310, on the basis of occurrence of a preconfigured event. In an embodiment, a preconfigured event may include: a case where the mode of an electronic device (for example: an electronic device 101) is changed in a state where a power management integrated circuit 310 and a primary battery are electrically connected to each other; a case where the primary battery is fully charged in a state where the mode of the electronic device (for example: the electronic device 101) is a battery charging mode and the power management integrated circuit 310 and the primary battery are electrically connected to each other; a case where the primary battery is fully discharged in a state where the mode of the electronic device (for example: the electronic device 101) is a battery using mode and the power management integrated circuit 310 and the primary battery are electrically connected to each other; or a combination thereof. In an embodiment, the mode of an electronic device (for example: an electronic device 101) may be at least one mode of a battery using mode or a battery charging mode. In an embodiment, a battery charging mode may be a mode in which charging power from an external electronic device (for example: an electronic device 102) is supplied to at least one battery (for example: a first battery 330) of two batteries 330 and 340. In an embodiment, a battery using mode may be a mode in which power of at least one battery (for example: a first battery 330) of two batteries 330 and 340 is supplied to other components (for example: a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197) of an electronic device (for example: an electronic device 101). In an embodiment, an external electronic device (for example: an electronic device 102) may be an electronic device which may charge another electronic device, such as a travel adaptor (TA), a wireless charger, or a battery pack, by supplying power to the electronic device.

In an embodiment, in a battery using mode, a power management integrated circuit 310 may control a switch 320 so as to electrically connect the power management integrated circuit 310 and a primary battery to each other, if the primary battery is not fully discharged. In an embodiment, in a battery using mode, a power management integrated circuit 310 may be supplied with power from an electrically connected primary battery and supply the supplied power to other components of an electronic device (for example: an electronic device 101).

In an embodiment, when a primary battery is fully discharged in a state where, in a battery using mode, a power management integrated circuit 310 is electrically connected to the primary battery, the power management integrated circuit 310 may control a switch 320 so as to electrically connect the power management integrated circuit 310 and a secondary battery to each other. In an embodiment, in a battery using mode, a power management integrated circuit 310 may be supplied with power from an electrically connected secondary battery and supply the supplied power to other components of an electronic device (for example: an electronic device 101).

In an embodiment, when power is supplied from an external electronic device (for example: an electronic device 102) in a state where, in a battery using mode, a power management integrated circuit 310 is electrically connected to a secondary battery, the power management integrated circuit 310 may identify shifting to a battery charging mode. In an embodiment, when shifting to a battery charging mode is identified in a state where a power management integrated circuit 310 is electrically connected to a secondary battery, the power management integrated circuit 310 may control a switch 320 so as to electrically connect the power management integrated circuit 310 and a primary battery to each other. In an embodiment, in a battery charging mode, a power management integrated circuit 310 may charge a primary battery by supplying power from an external electronic device (for example: an electronic device 102) to the primary battery.

In an embodiment, when a primary battery is fully charged in a state where, in a battery charging mode, a power management integrated circuit 310 is electrically connected to the primary battery, the power management integrated circuit 310 may control a switch 320 so as to electrically connect the power management integrated circuit 310 and a secondary battery to each other. In an embodiment, in a battery charging mode, a power management integrated circuit 310 may charge a secondary battery by supplying power from an external electronic device (for example: an electronic device 102) to the secondary battery.

In an embodiment, when the supply of power from an external electronic device (for example: an electronic device 102) is stopped in a state where, in a battery charging mode, a power management integrated circuit 310 is electrically connected to a secondary battery, the power management integrated circuit 310 may identify shifting to a battery using mode. In an embodiment, when shifting to a battery using mode is identified in a state where a power management integrated circuit 310 is electrically connected to a secondary battery, the power management integrated circuit 310 may control a switch 320 so as to electrically connect the power management integrated circuit 310 and a primary battery to each other. In an embodiment, in a battery using mode, a power management integrated circuit 310 may be supplied with power from an electrically connected primary battery and supply the supplied power to other components of an electronic device (for example: an electronic device 101).

Figure 4:
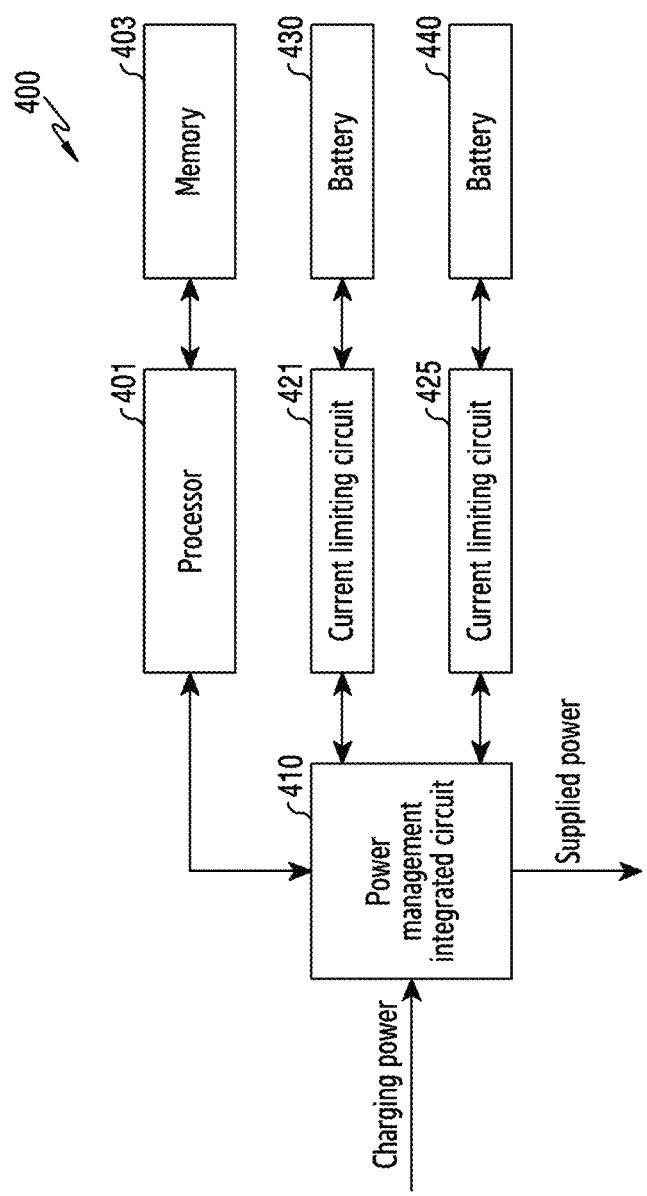
FIG. 4 illustrates a block diagram relating to a power management integrated circuit, a switch, and batteries of an electronic device according to an embodiment.

FIG. 4 illustrates a block diagram 400 relating to a processor 401, a memory 403, a power management integrated circuit 410, current limiting circuits 421, 425, and batteries 430, 440 of an electronic device (for example: an electronic device 101). The processor 401 illustrated in FIG. 4 may correspond to a processor 120 illustrated in FIG. 1. The memory 403 illustrated in FIG. 4 may correspond to a memory 130 illustrated in FIG. 1. The power management integrated circuit 410 may correspond to a power management module 188 illustrated in FIG. 1, a power management module 188 illustrated in FIG. 2, or a power management integrated circuit 310 illustrated in FIG. 3. Each of the batteries 430, 440 illustrated in FIG. 4 may correspond to a battery 189 illustrated in FIG. 1, a battery 189 illustrated in FIG. 2, or each of batteries 330, 340 illustrated in FIG. 3.

Referring to FIG. 4, a processor 401 of an electronic device (for example: electronic device 101) according to an embodiment may control a power management integrated circuit 410, a first current limiting circuit 321, a second current limiting circuit 325, or a combination thereof. In an embodiment, controlling, by a power management integrated circuit 410, a first current limiting circuit 321, a second current limiting circuit 325, or a combination thereof or reading and/or writing, by the power management integrated circuit 410, data stored in a memory 403 may be performed on the basis of controlling, by a processor 401, the power management integrated circuit 410.

The functional configuration of a power management integrated circuit 410 illustrated in FIG. 4 corresponds to the functional configuration of a power management integrated circuit 310 illustrated in FIG. 3, and thus the description about overlapping functional configurations may be omitted. The functional configuration of each of batteries 430, 440 illustrated in FIG. 4 correspond to the functional configuration of each of batteries 330, 340 illustrated in FIG. 3, and thus the description about overlapping functional configurations may be omitted.

Referring to FIG. 4, in an embodiment, a power management integrated circuit 410 may be electrically connected to at least one battery (for example: a battery 430) of two batteries 430 and 440 through current limiting circuits 421, 425.

In an embodiment, a power management integrated circuit 410 may charge at least one electrically connected battery (for example: a battery 430) by supplying charging power from an external electronic device (for example: an electronic device 102) to the battery (for example: the battery 430). In an embodiment, a power management integrated circuit 410 may be supplied with power from at least one battery (for example: a battery 430) and supply the received power to components (for example: a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197) of an electronic device (for example: an electronic device 101).

In an embodiment, a power management integrated circuit 410 may be electrically connected to at least one battery (for example: a first battery 430) of two batteries 430 and 440 by controlling the current limiting circuits 421, 425 of an electronic device (for example: an electronic device 101). In an embodiment, when a first current limiting circuit 421 is electrically connected to the at least one battery (for example: the first battery 430), a second current limiting circuit 425 may be electrically disconnected from the other battery (for example: a second battery 440).

In an embodiment, when charging power is supplied from an external electronic device (for example: an electronic device 102), a power management integrated circuit 410 may be electrically connected to at least one battery (for example: a first battery 430) of two batteries 430 and 440 and be electrically disconnected from the other battery (for example: a second battery 440) by controlling the current limiting circuits 421, 425, and may supply charging power to the at least one electrically connected battery (for example: the first battery 430) so as to charge the battery.

In an embodiment, when charging power is not supplied from an external electronic device (for example: an electronic device 102), a power management integrated circuit 410 may be electrically connected to at least one battery (for example: a first battery 430) of two batteries 430 and 440 and be electrically disconnected from the other battery (for example: a second battery 440) by controlling the current limiting circuits 421, 425, and may be supplied with power from the at least one electrically connected battery (for example: the first battery 430).

In an embodiment, a power management integrated circuit 410 may be electrically connected to both two batteries 430 and 440 by controlling the current limiting circuits 421, 425. In an embodiment, under the control of a power management integrated circuit 410, a first current limiting circuit 421 may be electrically connected to one battery (for example: a first battery 430) of the batteries 430 and 440, and a second current limiting circuit 425 may be electrically connected to the other battery (for example: a second battery 440).

In an embodiment, a power management integrated circuit 410 may control the current limiting circuits 421, 425 on the basis of a first full-charging voltage value of a first battery 430 which is fully charged and a second full-charging voltage value of a second battery 440 which is fully charged.

In an embodiment, a power management integrated circuit 410 may control the current limiting circuits 421, 425 such that the ratio between a first current of a first current limiting circuit 421 and a second current of a second current limiting circuit 425 corresponds to the ratio between a first full-charging voltage value and a second full-charging voltage value. In an embodiment, a power management integrated circuit 410 may control a first current of a first current limiting circuit 421 such that charging power having a current in proportion to the proportion of a first full-charging voltage value to the first full-charging voltage value and a second full-charging voltage value is supplied to a first battery 430. In an embodiment, a power management integrated circuit 410 may control a second current of a second current limiting circuit 425 such that charging power having a current in proportion to the proportion of a second full-charging voltage value to a first full-charging voltage value and the second full-charging voltage value is supplied to a second battery 440.

In an embodiment, when a current of a charging signal which may be supplied to two batteries 430 and 440 is 4.5 A, a first full-charging voltage value is 4.6 V, and a second full-charging voltage value is 4.4 V, a power management integrated circuit 410 may control the current limiting circuits 421, 425 such that a charging signal having 2.3 A of the current of 4.5 A is supplied to the first battery 430 and a charging signal having 2.2 A of the current of 4.5 A is supplied to the second battery 440.

In an embodiment, a power management integrated circuit 410 may control a first current of a first current limiting circuit 421 such that a power supply signal having a current in proportion to the proportion of a first full-charging voltage value to the first full-charging voltage value and a second full-charging voltage value is output from a first battery 430. In an embodiment, a power management integrated circuit 410 may control a second current of a second current limiting circuit 425 such that a power supply signal having a current in proportion to the proportion of a second full-charging voltage value to a first full-charging voltage value and the second full-charging voltage value is output from a second battery 440.

In an embodiment, when a current of a power supply signal required from two batteries 430 and 440 is 4.95 A, a first full-charging voltage value is 4.6 V, and a second full-charging voltage value is 4.4 V, a power management integrated circuit 410 may control the current limiting circuits 421, 425 such that a power supply signal having 2.53 A of the current of 4.95 A is output from the first battery 430 and a power supply signal having 2.42 A of the current of 4.95 A is output from the second battery 440.

In an embodiment, when one battery (for example: a first battery 430) of two batteries 430 and 440 is fully charged in a state where, in a battery charging mode, a power management integrated circuit 410 is electrically connected to the two batteries 430 and 440, the power management integrated circuit 410 may control the current limiting circuits 421, 425 such that a charging signal is supplied only to the other battery (for example: a second battery 440). In an embodiment, when one battery (for example: a first battery 430) of two batteries 430 and 440 is fully discharged in a state where, in a battery using mode, a power management integrated circuit 410 is electrically connected to the two batteries 430 and 440, the power management integrated circuit 410 may control the current limiting circuits 421, 425 such that a power supply signal is output only from the other battery (for example: a second battery 440).

Figure 5A:
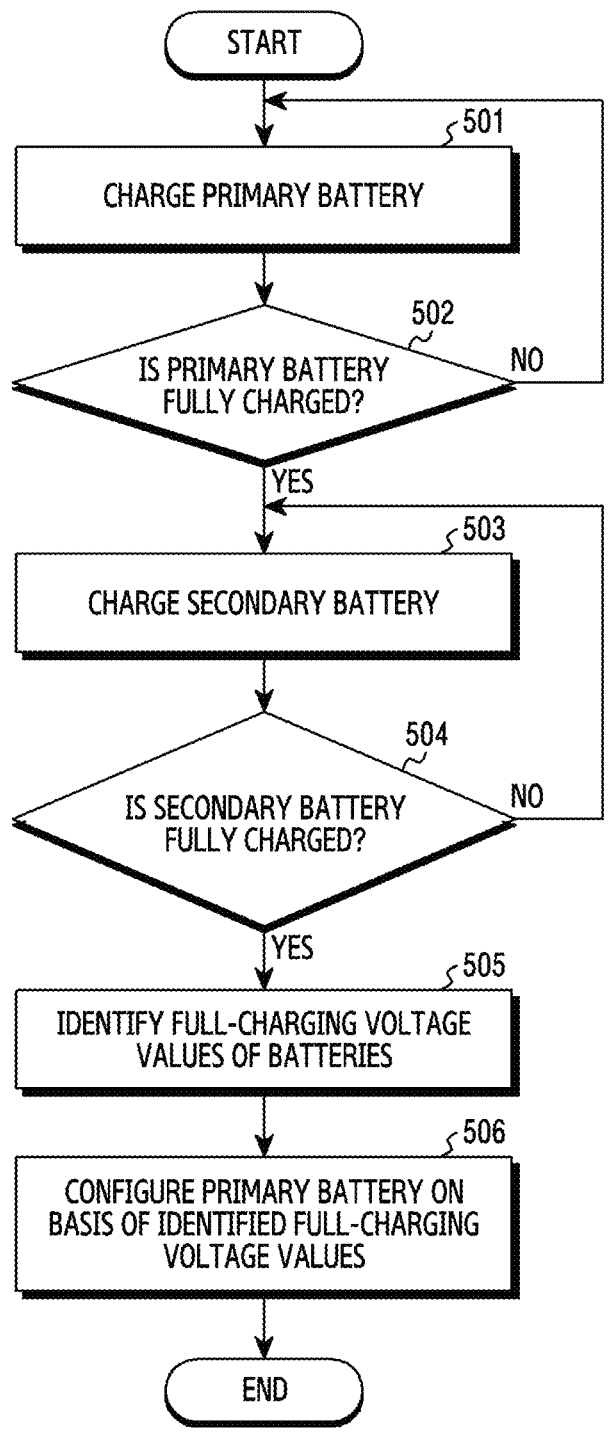
FIG. 5A illustrates a flow diagram for showing operations of an electronic device according to an embodiment.

FIG. 5A illustrates a flow diagram for showing operations of an electronic device (for example: an electronic device 101) according to an embodiment. FIG. 5A will be described on the basis of the functional configurations of a processor 301, a memory 303, a power management integrated circuit 310, a switch 320, and batteries 330, 340 of an electronic device (for example: an electronic device 101) according to an embodiment illustrated in FIG. 3.

Referring to FIG. 5A, in operation 501, a power management integrated circuit 310 of an electronic device (for example: an electronic device 101) may charge a primary battery (for example: a first battery 330). In an embodiment, when charging power is supplied from an external electronic device (for example: an electronic device 102), a power management integrated circuit 310 may charge a primary battery (for example: a first battery 330) by supplying the charging power to the primary battery (for example: the first battery 330).

In operation 502, a power management integrated circuit 310 may identify whether or not a primary battery (for example: a first battery 330) is fully charged. In operation 502, when it is identified that a primary battery (for example: a first battery 330) is fully charged ("Yes"), a power management integrated circuit 310 may perform operation 503. In operation 502, when it is identified that a primary battery (for example: a first battery 330) is not fully charged ("No"), a power management integrated circuit 310 may re-perform operation 501.

In operation 503, a power management integrated circuit 310 may charge a secondary battery (for example: a second battery 340). In an embodiment, when charging power is supplied from an external electronic device (for example: an electronic device 102) and a primary battery (for example: a first battery 330) is fully charged, a power management integrated circuit 310 may charge a secondary battery (for example: a second battery 340) by supplying the charging power to the secondary battery (for example: the second battery 340).

In operation 504, a power management integrated circuit 310 may identify whether or not a secondary battery (for example: a second battery 340) is fully charged. In operation 504, when it is identified that a secondary battery (for example: a second battery 340) is fully charged ("Yes"), a power management integrated circuit 310 may perform operation 505. In operation 504, when it is identified that a secondary battery (for example: a second battery 340) is not fully charged ("No"), a power management integrated circuit 310 may re-perform operation 503.

In operation 504, a power management integrated circuit 310 may identify full-charging voltage values of batteries 330, 340.

In operation 505, a power management integrated circuit 310 may configure a primary battery and a secondary battery on the basis of identified full-charging voltage values. In operation 505, a power management integrated circuit 310 may configure, as a primary battery, a battery (for example: a second battery 340) having a high full-charging voltage value from among identified full-charging voltage values. In operation 505, a power management integrated circuit 310 may configure, as a secondary battery, a battery (for example: a first battery 330) having a low full-charging voltage value from among identified full-charging voltage values.

Figure 5B:
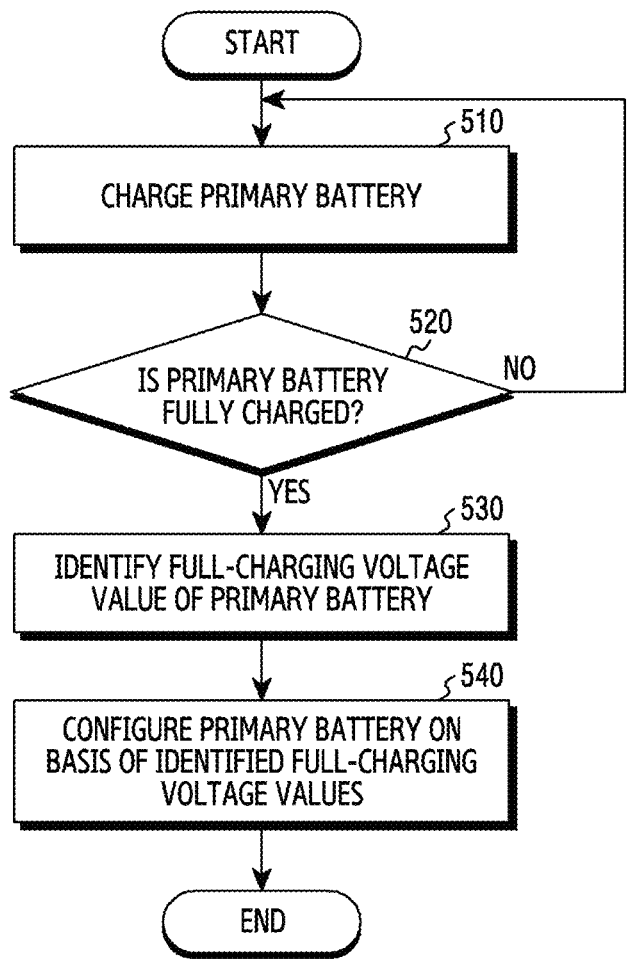
FIG. 5B illustrates a flow diagram for showing operations of an electronic device according to an embodiment.

FIG. 5B illustrates a flow diagram for showing operations of an electronic device (for example: an electronic device 101) according to an embodiment. FIG. 5B will be described on the basis of the functional configurations of a processor 301, a memory 303, a power management integrated circuit 310, a switch 320, and batteries 330, 340 of an electronic device (for example: an electronic device 101) according to an embodiment illustrated in FIG. 3.

Referring to FIG. 5B, in operation 510, a power management integrated circuit 310 of an electronic device (for example: an electronic device 101) may charge a primary battery (for example: a first battery 330). In an embodiment, when charging power is supplied from an external electronic device (for example: an electronic device 102), a power management integrated circuit 310 may charge a primary battery (for example: a first battery 330) by supplying the charging power to the primary battery (for example: the first battery 330).

In operation 520, a power management integrated circuit 310 may identify whether or not a primary battery (for example: a first battery 330) is fully charged. In operation 520, when it is identified that a primary battery (for example: a first battery 330) is fully charged ("Yes"), a power management integrated circuit 310 may perform operation 530. In operation 520, when it is identified that a primary battery (for example: a first battery 330) is not fully charged ("No"), a power management integrated circuit 310 may re-perform operation 510.

In operation 530, a power management integrated circuit 310 may identify a full-charging voltage value of a primary battery (for example: a first battery 330). In an embodiment, a power management integrated circuit 310 may identify a full-charging voltage value of a primary battery (for example: a first battery 330) by measuring, using a power gauge 230, a full-charging voltage value of the primary battery (for example: the first battery 330) which is fully charged.

In operation 540, a power management integrated circuit 310 may configure a primary battery and a secondary battery on the basis of identified full-charging voltage values. In operation 540, when a full-charging voltage value of a primary battery (for example: a first battery 330) is lower than a conventional full-charging voltage value of a secondary battery (for example: a second battery 340), a power management integrated circuit 310 may configure the primary battery (for example: the first battery 330) as a secondary battery and the secondary battery (for example: the second battery 340) as a primary battery. In operation 540, when a full-charging voltage value of a primary battery (for example: a first battery 330) is higher than a conventional full-charging voltage value of a secondary battery (for example: a second battery 340), a power management integrated circuit 310 may configure the primary battery (for example: the first battery 330) as a primary battery and the secondary battery (for example: the second battery 340) as a secondary battery.

Figure 6:
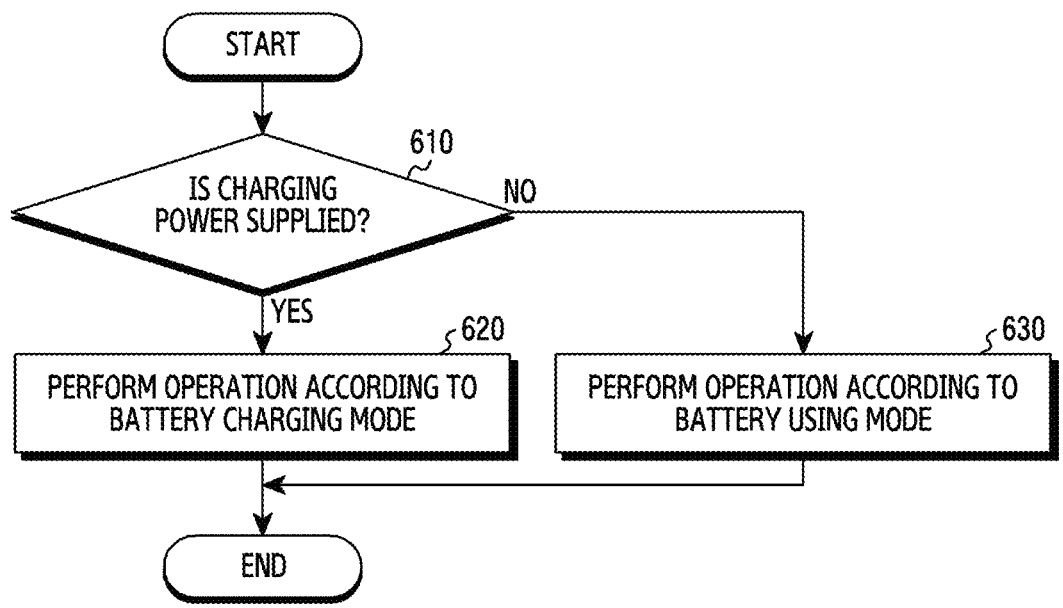
FIG. 6 illustrates a flow diagram for showing operations of an electronic device according to an embodiment.

FIG. 6 illustrates a flow diagram for showing operations of an electronic device (for example: an electronic device 101) according to an embodiment. FIG. 6 will be described on the basis of the functional configurations of a processor 301, a memory 303, a power management integrated circuit 310, a switch 320, and batteries 330, 340 of an electronic device (for example: an electronic device 101) according to an embodiment illustrated in FIG. 3.

Referring to FIG. 6, in operation 610, a power management integrated circuit 310 of an electronic device (for example: an electronic device 101) may identify whether or not charging power is supplied. In an embodiment, when it is identified that charging power is supplied ("Yes"), a power management integrated circuit 310 may perform operation 620. In an embodiment, when it is identified that charging power is not supplied ("No"), a power management integrated circuit 310 may perform operation 630.

In operation 620, a power management integrated circuit 310 may perform operations according to a battery charging mode. In an embodiment, an operation according to a battery charging mode may be an operation for a power management integrated circuit 310 to supply charging power to at least one electrically connected battery (for example: a battery 330) of two batteries 330 and 340 so as to charge the at least one battery (for example: the battery 330).

In operation 630, a power management integrated circuit 310 may perform operations according to a battery using mode. In an embodiment, an operation according to a battery using mode may be an operation for a power management integrated circuit 310 to be supplied with power through one electrically connected battery (for example: a battery 330) of two batteries 330 and 340 and supply the supplied power to other components (a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197) of an electronic device (for example: an electronic device 101).

Figure 7:
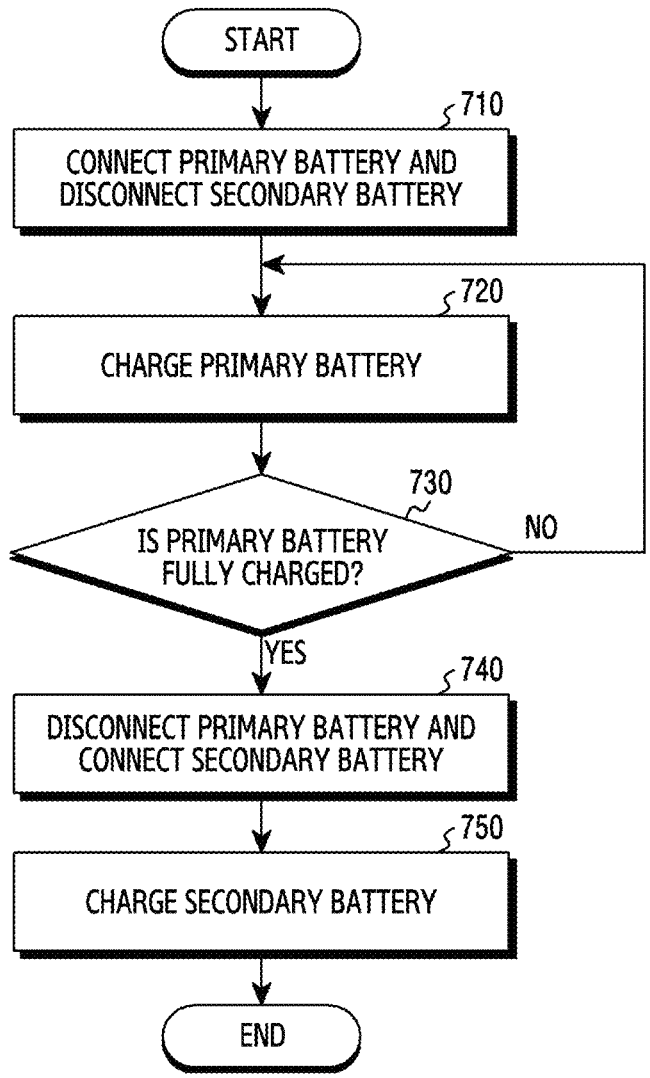
FIG. 7 illustrates a flow diagram for showing operations of an electronic device according to an embodiment.

FIG. 7 illustrates a diagram for showing operations of an electronic device (for example: an electronic device 101) according to an embodiment. FIG. 7 will be described on the basis of the functional configurations of a processor 301, a memory 303, a power management integrated circuit 310, a switch 320, and batteries 330, 340 of an electronic device (for example: an electronic device 101) according to an embodiment illustrated in FIG. 3.

FIG. 7 is a flow diagram for showing operations according to a battery charging mode of FIG. 6.

Referring to FIG. 7, in operation 710, a power management integrated circuit 310 of an electronic device (for example: an electronic device 101) may connect a primary battery to the power management integrated circuit 310 and disconnect a secondary battery therefrom. In an embodiment, a power management integrated circuit 310 may control a switch 320 such that the power management integrated circuit 310 is electrically connected to a primary battery (for example: a first battery 330) from among two batteries 330 and 340, and thus may be electrically connected to the primary battery. In an embodiment, when a power management integrated circuit 310 is electrically connected to the primary battery (for example: the first battery 330), the power management integrated circuit 310 may not be electrically connected to a secondary battery (for example: a second battery 340).

In operation 720, a power management integrated circuit 310 of an electronic device (for example: an electronic device 101) may charge a primary battery (for example: a first battery 330). In an embodiment, a power management integrated circuit 310 may charge a primary battery (for example: a first battery 330) by supplying charging power from an external electronic device (for example: an electronic device 102) to the primary battery (for example: the first battery 330).

In operation 730, a power management integrated circuit 310 may identify whether a primary battery (for example: a first battery 330) is fully charged. In an embodiment, when a primary battery (for example: a first battery 330) shifts from a constant-voltage charging state to a charging end state, it may be identified by a power management integrated circuit 310 that the primary battery is fully charged. In operation 730, when it is identified that a primary battery (for example: a first battery 330) is fully charged ("Yes"), a power management integrated circuit 310 may perform operation 740. In operation 730, when it is identified that a primary battery (for example: a first battery 330) is not fully charged ("No"), a power management integrated circuit 310 may perform operation 720.

In operation 740, a power management integrated circuit 310 of an electronic device (for example: an electronic device 101) may electrically disconnect a primary battery from the power management integrated circuit 310 and electrically connect a secondary battery thereto. In an embodiment, a power management integrated circuit 310 may control a switch 320 such that the power management integrated circuit 310 is electrically connected to a secondary battery (for example: a second battery 340) from among two batteries 330 and 340, and thus may be electrically connected to the secondary battery. In an embodiment, when a power management integrated circuit 310 is electrically connected to the secondary battery (for example: the second battery 340), the power management integrated circuit 310 may not be electrically connected to a primary battery (for example: a first battery 330).

In operation 750, a power management integrated circuit 310 of an electronic device (for example: an electronic device 101) may charge a secondary battery (for example: a second battery 340). In an embodiment, a power management integrated circuit 310 may charge a secondary battery (for example: a second battery 340) by supplying charging power from an external electronic device (for example: an electronic device 102) to the secondary battery (for example: the second battery 340). In an embodiment, while operations 710 to 750 are performed, a power management integrated circuit 310 may be supplied with charging power from an external electronic device (for example: electronic device 102).

Figure 8:
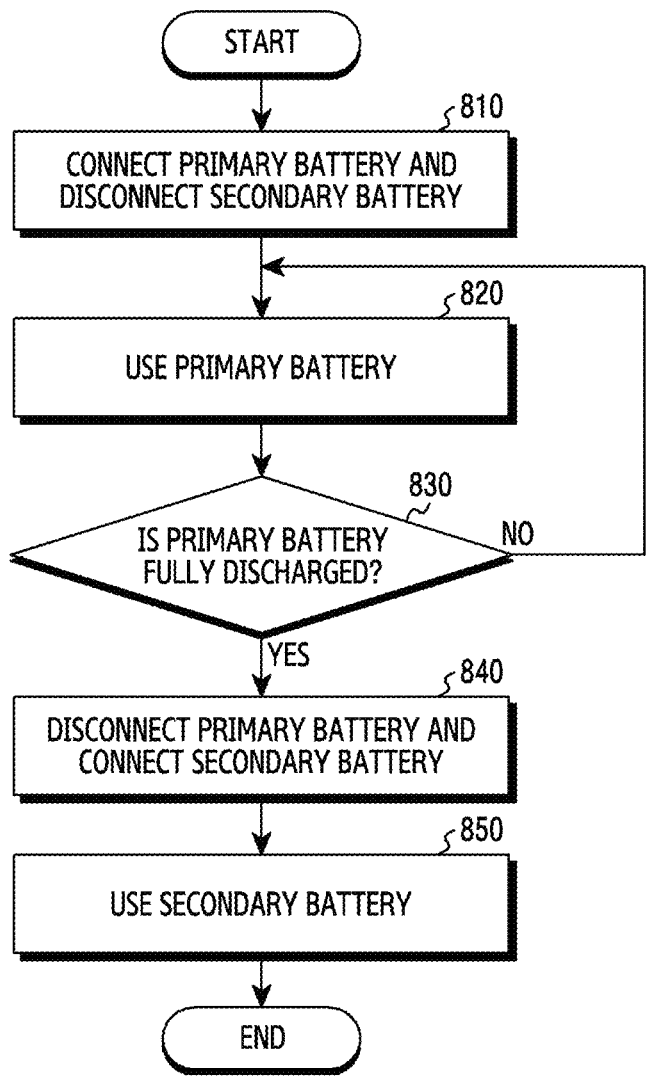
FIG. 8 illustrates a flow diagram for showing operations of an electronic device according to an embodiment.

FIG. 8 illustrates a flow diagram for showing operations of an electronic device (for example: an electronic device 101) according to an embodiment. FIG. 8 will be described on the basis of the functional configurations of a processor 301, a memory 303, a power management integrated circuit 310, a switch 320, and batteries 330, 340 of an electronic device (for example: an electronic device 101) according to an embodiment illustrated in FIG. 3. Operation 810 and operation 840 of FIG. 8 correspond to operation 710 and operation 740 of FIG. 7, and thus the overlapping description may be omitted.

FIG. 8 may be a flow diagram for showing operations according to a battery using mode.

Referring to FIG. 8, in operation 810, a power management integrated circuit 310 of an electronic device (for example: an electronic device 101) may connect a primary battery to the power management integrated circuit 310 and disconnect a secondary battery therefrom. In an embodiment, a power management integrated circuit 310 may control a switch 320 such that the power management integrated circuit 310 is electrically connected to a primary battery (for example: a first battery 330) from among two batteries 330 and 340, and thus may be electrically connected to the primary battery. In an embodiment, when a power management integrated circuit 310 is electrically connected to the primary battery (for example: the first battery 330), the power management integrated circuit 310 may not be electrically connected to a secondary battery (for example: a second battery 340).

In operation 820, a power management integrated circuit 310 of an electronic device (for example: an electronic device 101) may use a primary battery (for example: a first battery 330). In an embodiment, a power management integrated circuit 310 may use a primary battery (for example: a first battery 330) by being supplied with power from the primary battery (for example: the first battery 330) and supplying the supplied power to other components of an electronic device (for example: an electronic device 101).

In operation 830, a power management integrated circuit 310 may identify whether or not a primary battery (for example: a first battery 330) is fully discharged. In an embodiment, when a current voltage value of a primary battery (for example: a first battery 330) is equal to or less than a configured discharging voltage value (for example: 3.6 volt (V)), it may be identified by a power management integrated circuit 310 that the primary battery is fully discharged. In operation 830, when it is identified that a primary battery (for example: a first battery 330) is fully discharged ("Yes"), a power management integrated circuit 310 may perform operation 840. In operation 830, when it is identified that a primary battery (for example: a first battery 330) is not fully discharged ("No"), a power management integrated circuit 310 may perform operation 820.

In operation 840, a power management integrated circuit 310 of an electronic device (for example: an electronic device 101) may electrically disconnect a primary battery from the power management integrated circuit 310 and electrically connect a secondary battery thereto. In an embodiment, a power management integrated circuit 310 may control a switch 320 such that the power management integrated circuit 310 is electrically connected to a secondary battery (for example: a second battery 340) from among two batteries 330 and 340, and thus may be electrically connected to the secondary battery. In an embodiment, when a power management integrated circuit 310 is electrically connected to the secondary battery (for example: the second battery 340), the power management integrated circuit 310 may not be electrically connected to a primary battery (for example: a first battery 330).

In operation 850, a power management integrated circuit 310 of an electronic device (for example: an electronic device 101) may use a secondary battery (for example: a second battery 340). In an embodiment, a power management integrated circuit 310 may use a secondary battery (for example: a second battery 340) by being supplied with power from the secondary battery (for example: the second battery 340) and supplying the supplied power to other components of an electronic device (for example: an electronic device 101).

Figure 9:
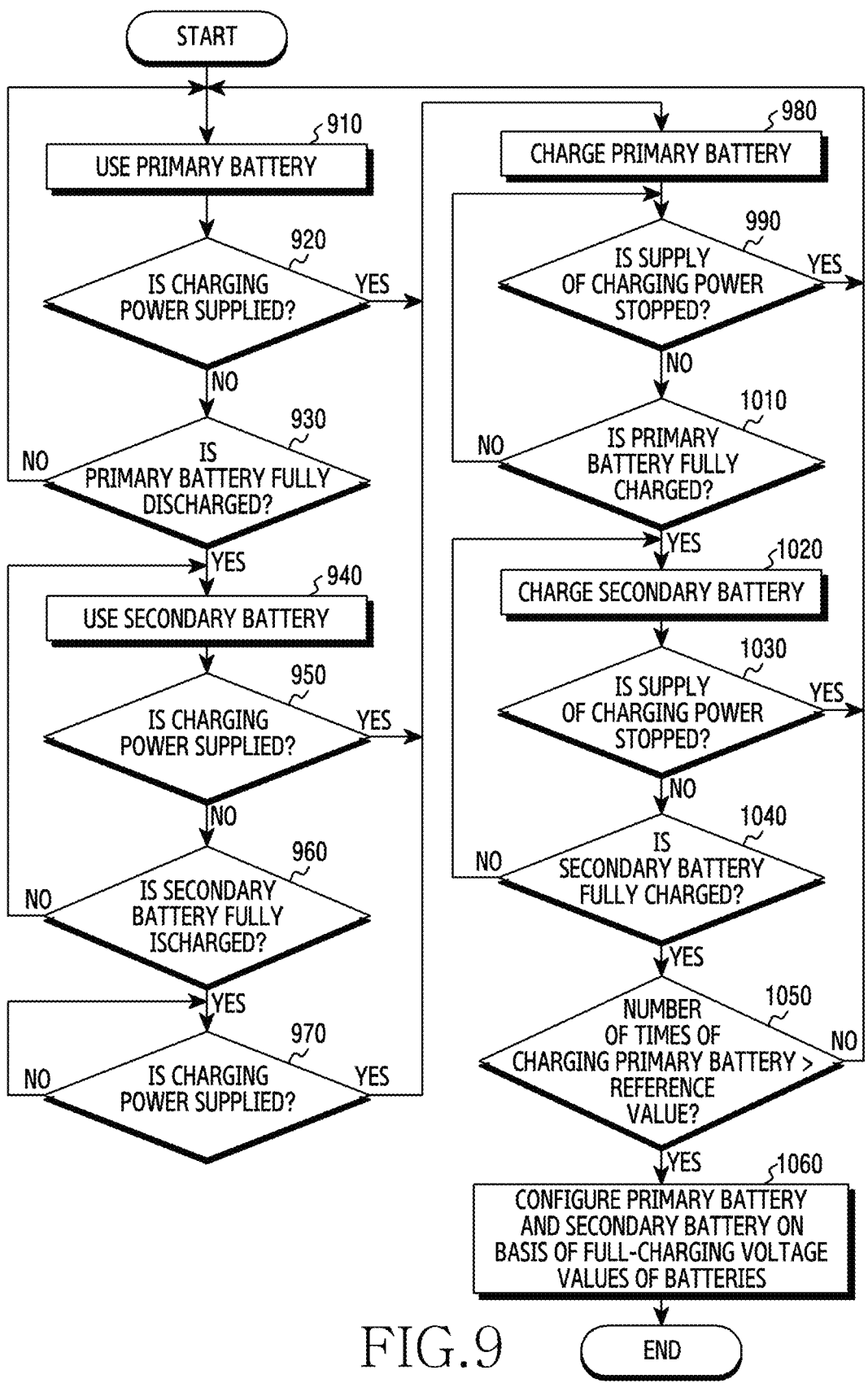
FIG. 9 illustrates a diagram for showing operations of an electronic device according to an embodiment.

FIG. 9 illustrates a flow diagram for showing operations of an electronic device (for example: an electronic device 101) according to an embodiment. FIG. 9 will be described on the basis of the functional configurations of a processor 301, a memory 303, a power management integrated circuit 310, a switch 320, and batteries 330, 340 of an electronic device (for example: an electronic device 101) according to an embodiment illustrated in FIG. 3.

In operation 910, a power management integrated circuit 310 of an electronic device (for example: an electronic device 101) may use a primary battery (for example: a first battery 330). In an embodiment, a power management integrated circuit 310 may use a primary battery (for example: a first battery 330) by being supplied with power from the primary battery (for example: the first battery 330) and supplying the supplied power to other components of an electronic device (for example: an electronic device 101). In an embodiment, in order to use a primary battery (for example: a first battery 330), a power management integrated circuit 310 may control a switch 320 to connect the primary battery thereto and disconnect a secondary battery therefrom.

In operation 920, a power management integrated circuit 310 of an electronic device (for example: an electronic device 101) may identify whether or not charging power is supplied. In operation 920, when it is identified that charging power is supplied ("Yes"), a power management integrated circuit 310 may perform operation 980. In operation 920, when it is identified that charging power is not supplied ("No"), a power management integrated circuit 310 may perform operation 930.

In operation 930, a power management integrated circuit 310 may identify whether or not a primary battery (for example: a first battery 330) is fully discharged. In an embodiment, when a current voltage value of a primary battery (for example: a first battery 330) is equal to or less than a configured discharging voltage value (for example: 3.6 volt (V)), it may be identified by a power management integrated circuit 310 that the primary battery is fully discharged. In operation 930, when it is identified that a primary battery (for example: a first battery 330) is fully discharged ("Yes"), a power management integrated circuit 310 may perform operation 940. In operation 930, when it is identified that a primary battery (for example: a first battery 330) is not fully discharged ("No"), a power management integrated circuit 310 may perform operation 910.

In operation 940, a power management integrated circuit 310 of an electronic device (for example: an electronic device 101) may use a secondary battery (for example: a second battery 340). In an embodiment, a power management integrated circuit 310 may use a secondary battery (for example: a second battery 340) by being supplied with power from the secondary battery (for example: the second battery 340) and supplying the supplied power to other components of an electronic device (for example: an electronic device 101). In an embodiment, in order to use a second battery (for example: a second battery 340), a power management integrated circuit 310 may control a switch 320 to connect the secondary battery thereto and disconnect a primary battery therefrom.

In operation 950, a power management integrated circuit 310 of an electronic device (for example: an electronic device 101) may identify whether or not charging power is supplied. In operation 950, when it is identified that charging power is supplied ("Yes"), a power management integrated circuit 310 may perform operation 980. In operation 950, when it is identified that charging power is not supplied ("No"), a power management integrated circuit 310 may perform operation 960.

In operation 960, a power management integrated circuit 310 may identify whether or not a secondary battery (for example: a second battery 340) is fully discharged. In an embodiment, when a current voltage value of a secondary battery (for example: a second battery 340) is equal to or less than a configured discharging voltage value (for example: 3.6 volt (V)), it may be identified by a power management integrated circuit 310 that the secondary battery is fully discharged. In operation 960, when it is identified that a secondary battery (for example: a second battery 340) is fully discharged ("Yes"), a power management integrated circuit 310 may perform operation 970. In operation 970, when it is identified that a secondary battery (for example: a second battery 340) is not fully discharged ("No"), a power management integrated circuit 310 may perform operation 940.

In operation 970, a power management integrated circuit 310 of an electronic device (for example: an electronic device 101) may identify whether or not charging power is supplied. In operation 970, when it is identified that charging power is supplied ("Yes"), a power management integrated circuit 310 may perform operation 980. In operation 970, when it is identified that charging power is not supplied ("No"), a power management integrated circuit 310 may re-perform operation 970.

In operation 980, a power management integrated circuit 310 of an electronic device (for example: an electronic device 101) may charge a primary battery (for example: a first battery 330). In an embodiment, a power management integrated circuit 310 may charge a primary battery (for example: a first battery 330) by supplying charging power from an external electronic device (for example: an electronic device 102) to the primary battery (for example: the first battery 330). In an embodiment, in order to charge a primary battery (for example: a first battery 330), a power management integrated circuit 310 may control a switch 320 to connect the primary battery thereto and disconnect a secondary battery therefrom.

In operation 990, a power management integrated circuit 310 of an electronic device (for example: an electronic device 101) may identify whether or not the supply of charging power is stopped. In operation 990, when it is identified that the supply of charging power is stopped ("Yes"), a power management integrated circuit 310 may perform operation 910. In operation 990, when it is identified that the supply of charging power is not stopped ("No"), a power management integrated circuit 310 may perform operation 1010.

In operation 1010, a power management integrated circuit 310 may identify whether a primary battery (for example: a first battery 330) is fully charged. In an embodiment, when a primary battery (for example: a first battery 330) shifts from a constant-voltage charging state to a charging end state, it may be identified by a power management integrated circuit 310 that the primary battery is fully charged. In operation 1010, when it is identified that a primary battery (for example: a first battery 330) is fully charged ("Yes"), a power management integrated circuit 310 may perform operation 1020. In operation 1010, when it is identified that a primary battery (for example: a first battery 330) is not fully charged ("No"), a power management integrated circuit 310 may perform operation 990.

In operation 1020, a power management integrated circuit 310 of an electronic device (for example: an electronic device 101) may charge a secondary battery (for example: a second battery 340). In an embodiment, a power management integrated circuit 310 may charge a secondary battery (for example: a second battery 340) by supplying charging power from an external electronic device (for example: an electronic device 102) to the secondary battery (for example: the second battery 340). In an embodiment, in order to charge a secondary battery (for example: a second battery 340), a power management integrated circuit 310 may control a switch 320 to connect the secondary battery thereto and disconnect a primary battery therefrom.

In operation 1030, a power management integrated circuit 310 of an electronic device (for example: an electronic device 101) may identify whether or not the supply of charging power is stopped. In operation 1030, when it is identified that the supply of charging power is stopped ("Yes"), a power management integrated circuit 310 may perform operation 910. In operation 990, when it is identified that the supply of charging power is not stopped ("No"), a power management integrated circuit 310 may perform operation 1040.

In operation 1040, a power management integrated circuit 310 may identify whether a secondary battery (for example: a second battery 340) is fully charged. In an embodiment, when a secondary battery (for example: a second battery 340) shifts from a constant-voltage charging state to a charging end state, it may be identified by a power management integrated circuit 310 that the secondary battery is fully charged. In operation 1040, when it is identified that a secondary battery (for example: a second battery 340) is fully charged ("Yes"), a power management integrated circuit 310 may perform operation 1050. In operation 1040, when it is identified that a secondary battery (for example: a second battery 340) is not fully charged ("No"), a power management integrated circuit 310 may perform operation 1020.

In operation 1050, a power management integrated circuit 310 may identify whether the number of charging times of a primary battery (for example: a first battery 330) exceeds a reference value. In an embodiment, a reference value may be an integer multiple of a reference number of charging times (for example: 100 times). In operation 1050, when the number of charging times of a primary battery (for example: a first battery 330) exceeds a reference value ("Yes"), a power management integrated circuit 310 may perform operation 1060. In operation 1050, when the number of charging times of a primary battery (for example: a first battery 330) does not exceed a reference value ("No"), a power management integrated circuit 310 may perform operation 910.

In operation 1060, a power management integrated circuit 310 may configure a primary battery and a secondary battery on the basis of full-charging voltage values of batteries 330, 340. In operation 1060, when a full-charging voltage value of a primary battery (for example: a first battery 330) is lower than a conventional full-charging voltage value of a secondary battery (for example: a second battery 340), a power management integrated circuit 310 may configure the primary battery (for example: the first battery 330) as a secondary battery and the secondary battery (for example: the second battery 340) as a primary battery. In operation 1060, when a full-charging voltage value of a primary battery (for example: a first battery 330) is higher than a conventional full-charging voltage value of a secondary battery (for example: a second battery 340), a power management integrated circuit 310 may configure the primary battery (for example: the first battery 330) as a primary battery and the secondary battery (for example: the second battery 340) as a secondary battery. In an embodiment, in order to configure a primary battery and a secondary battery, a power management integrated circuit 310 may identify full-charging voltage values of batteries 330, 340.

In operation 1060, when configuring a primary battery and a secondary battery is completed, a power management integrated circuit 310 may terminate this operation. In an embodiment, when this operation is terminated, a power management integrated circuit 310 restarts this operation.

As described above, an electronic device 101 according to an embodiment may determine, on the basis of respective full-charging voltage values of two rechargeable batteries (for example: batteries 330, 340), a battery (for example: a first battery 330) which is to be initially used, and thus may control the two rechargeable batteries (for example: the batteries 330, 340) such that the respective full-charging voltage values of the two rechargeable batteries (for example: the batteries 330, 340) reach a voltage limit (for example: 3.6 volt (V)) in a state where the values are similar to each other. As described above, an electronic device 101 according to an embodiment may enable two rechargeable batteries (for example: batteries 330, 340) of the electronic device 101 to have lives equivalent to each other by controlling the two rechargeable batteries (for example: the batteries 330, 340) such that respective full-charging voltage values of the two rechargeable batteries (for example: the batteries 330, 340) reach a voltage limit (for example: 3.6 volt (V)) in a state where the values are similar to each other.

As described above, an electronic device 101 according to an embodiment may control two rechargeable batteries (for example: batteries 330, 340) so as to allow the two rechargeable batteries (for example: batteries 330, 340) to have lives equivalent to each other, and thus may maximally utilize the lives of the two rechargeable batteries (for example: batteries 330, 340). As described above, an electronic device 101 according to an embodiment may maximally utilize the lives of two rechargeable batteries (for example: batteries 330, 340), and thus may expect the effect in that the lives of batteries included in the electronic device 101 are increased.

As described above, an electronic device 101 according to an embodiment may include: a first battery; a second battery; a power management integrated circuit; a memory configured to store information on a first full-charging voltage value of the first battery which is fully charged and a second full-charging voltage value of the second battery which is fully charged; and a processor, wherein the processor is configured to: while supplying power to the electronic device by using at least one battery of the first battery or the second battery, detect whether or not the electronic device is connected to an external electronic device for supplying power to the first battery or the second battery; in response to the detection, when it is identified that the first full-charging voltage value is higher than the second full-charging voltage value, electrically connect the first battery to the power management integrated circuit and electrically disconnect the second battery from the power management integrated circuit; and charge, on the basis of power obtained from the external electronic device, the first battery electrically connected to the power management integrated circuit.

In an embodiment, the processor may be configured to renew, on the basis of an accumulated charging charge amount of the first battery, the full-charging voltage value of the first battery stored in the memory, when it is identified that the first battery is fully charged.

In an embodiment, the processor may be configured to renew the full-charging voltage value of the first battery stored in the memory, after the accumulated charging charge amount of the first battery exceeds a configured accumulated charging charge amount.

In an embodiment, the power management integrated circuit may be configured to be electrically connected to the first battery or the second battery through a switch.

In an embodiment, the power management integrated circuit may be configured to be electrically connected to the first battery through a first current limiting circuit and to be electrically connected to the second battery through a second current limiting circuit.

In an embodiment, the processor may be configured to electrically disconnect the first battery from the power management integrated circuit and to electrically connect the second battery to the power management integrated circuit, when it is identified that the first battery is fully charged.

In an embodiment, the processor may be configured to renew, on the basis of an accumulated charging charge amount of the second battery, the full-charging voltage value of the second battery stored in the memory, when it is identified that the second battery is fully charged.

In an embodiment, the processor may be configured to: detect whether or not the electronic device is electrically disconnected from the external electronic device for supplying power to the first battery or the second battery; in response to the detection of the disconnection thereof from the external electronic device, identify a state of the first battery electrically connected to the power management integrated circuit; and when it is identified that the first battery is fully discharged, electrically disconnect the first battery from the power management integrated circuit and electrically connect the second battery to the power management integrated circuit.

As described above, a method for operating an electronic device 101 according to an embodiment may include: while supplying power to the electronic device by using at least one battery of a first battery or a second battery, detecting whether or not the electronic device is connected to an external electronic device for supplying power to the first battery or the second battery; in response to the detection, electrically connecting the first battery to a power management integrated circuit and electrically disconnecting the second battery from the power management integrated circuit, on the basis of a first full-charging voltage value of the first battery which is fully charged, the first full-charging voltage being stored in a memory, and a second full-charging voltage value of the second battery which is fully charged, the second full-charging voltage value being lower than the first full-charging voltage value; and charging, on the basis of power obtained from the external electronic device, the first battery electrically connected to the power management integrated circuit.

In an embodiment, the method may further include renewing, on the basis of an accumulated charging charge amount of the first battery, the full-charging voltage value of the first battery stored in the memory, when it is identified that the first battery is fully charged.

In an embodiment, the renewing of the full-charging voltage value of the first battery may include renewing the full-charging voltage value of the first battery stored in the memory, after the accumulated charging charge amount of the first battery exceeds a configured accumulated charging charge amount.

In an embodiment, the method may further include electrically disconnecting the first battery from the power management integrated circuit and electrically connecting the second battery to the power management integrated circuit, when it is identified that the first battery is fully charged.

In an embodiment, the method may further include renewing, on the basis of an accumulated charging charge amount of the second battery, the full-charging voltage value of the second battery stored in the memory, when it is identified that the second battery is fully charged.

In an embodiment, the method may further include: detecting whether or not the electronic device is electrically disconnected from the external electronic device for supplying power to the first battery or the second battery; in response to the detection of the disconnection thereof from the external electronic device, identifying a state of the first battery electrically connected to the power management integrated circuit; and when it is identified that the first battery is fully discharged, electrically disconnecting the first battery from the power management integrated circuit and electrically connecting the second battery to the power management integrated circuit.

As described above, an electronic device 101 according to an embodiment may include: a first battery; a second battery; a memory configured to store information on a first full-charging voltage value of the first battery which is fully charged and a second full-charging voltage value of the second battery which is fully charged, the second full-charging voltage value being lower than the first full-charging voltage value; a power management integrated circuit configured to be electrically connected to the first battery through a first current limiting circuit and to be electrically connected to the second battery through a second current limiting circuit; and a processor, wherein the processor is configured to: while supplying power to the electronic device by using at least one battery of the first battery or the second battery, detect whether or not the electronic device is connected to an external electronic device; in response to the detection, supply, on the basis of the proportion of the first full-charging voltage value to the first full-charging voltage value and the second full-charging voltage value, a part of power obtained from the external electronic device to the first battery; and in response to the detection, supply, on the basis of the proportion of the second full-charging voltage value to the first full-charging voltage value and the second full-charging voltage value, the remainder of the power obtained from the external electronic device to the second battery.

In an embodiment, the processor may be configured to renew, on the basis of an accumulated charging charge amount of the first battery, the full-charging voltage value of the first battery stored in the memory, when it is identified that the first battery is fully charged.

In an embodiment, the processor may be configured to renew the full-charging voltage value of the first battery stored in the memory, after the accumulated charging charge amount of the first battery exceeds a configured accumulated charging charge amount.

In an embodiment, the processor may be configured to control the power management integrated circuit so as to electrically disconnect the first battery from the power management integrated circuit, when it is identified that the first battery is fully charged.

In an embodiment, the processor may be configured to renew, on the basis of an accumulated charging charge amount of the second battery, the full-charging voltage value of the second battery stored in the memory, when it is identified that the second battery is fully charged.

In an embodiment, the processor may be configured to: detect whether or not the electronic device is electrically disconnected from the external electronic device; in response to the detection of the disconnection thereof from the external electronic device, supply, on the basis of the proportion of the first full-charging voltage value to the first full-charging voltage value and the second full-charging voltage value, first power from the first battery to the power management integrated circuit; and in response to the detection of the disconnection thereof from the external electronic device, supply, on the basis of the proportion of the second full-charging voltage value to the first full-charging voltage value and the second full-charging voltage value, second power from the second battery to the power management integrated circuit, wherein the ratio between the first power and the second power is configured to correspond to the ratio between the first full-charging voltage value and the second full-charging voltage value.

Methods according to an embodiment of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to an embodiment of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and an embodiment of the present disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first battery;
   a second battery;
   a power management integrated circuit;
   a memory configured to store information on a first full-charging voltage value of the first battery when fully charged and a second full-charging voltage value of the second battery when fully charged; and
   a processor, wherein the processor is configured to:
   while supplying power to the electronic device by using power supplied from at least one battery of the first battery or the second battery, detect whether the electronic device is connected to an external electronic device for supplying power to the first battery or the second battery;
   in response to the detection of the electronic device connected to the external electronic device, when it is identified that the first full-charging voltage value is greater than the second full-charging voltage value, electrically connect the first battery to the power management integrated circuit and electrically disconnect the second battery from the power management integrated circuit; and
   charge the first battery electrically connected to the power management integrated circuit based on the power obtained from the external electronic device.

2. The electronic device of claim 1, wherein the processor is further configured to renew the first full-charging voltage value of the first battery stored in the memory based on an accumulated charging charge amount of the first battery, when it is identified that the first battery is fully charged.

3. The electronic device of claim 2, wherein the processor is further configured to renew the first full-charging voltage value of the first battery stored in the memory, after the accumulated charging charge amount of the first battery exceeds a configured accumulated charging charge amount.

4. The electronic device of claim 1, wherein the power management integrated circuit is configured to be electrically connected to the first battery or the second battery through a switch.

5. The electronic device of claim 1, wherein the power management integrated circuit is configured to be electrically connected to the first battery through a first current limiting circuit and to be electrically connected to the second battery through a second current limiting circuit.

6. The electronic device of claim 1, wherein the processor is further configured to electrically disconnect the first battery from the power management integrated circuit and to electrically connect the second battery to the power management integrated circuit, when it is identified that the first battery is fully charged.

7. The electronic device of claim 6, wherein the processor is further configured to renew the second full-charging voltage value of the second battery stored in the memory based on an accumulated charging charge amount of the second battery, when it is identified that the second battery is fully charged.

8. The electronic device of claim 1, wherein the processor is configured to:
   detect whether the electronic device is electrically disconnected from the external electronic device for supplying power to the first battery or the second battery;
   in response to detecting that the electronic device is disconnected from the external electronic device, identify a state of the first battery electrically connected to the power management integrated circuit; and
   when it is identified that the first battery is fully discharged, electrically disconnect the first battery from the power management integrated circuit and electrically connect the second battery to the power management integrated circuit.

9. A method for operating an electronic device, the method comprising:
   while supplying power to the electronic device by using power supplied from at least one battery of a first battery or a second battery, detecting whether the electronic device is connected to an external electronic device for supplying power to the first battery or the second battery;
   in response to the detection of the electronic device connected to the external electronic device, electrically connecting the first battery to a power management integrated circuit and electrically disconnecting the second battery from the power management integrated circuit, based on a first full-charging voltage value of the first battery when fully charged, the first full-charging voltage value is stored in a memory, and a second full-charging voltage value of the second battery when fully charged, the second full-charging voltage value being lesser than the first full-charging voltage value; and
   charging the first battery electrically connected to the power management integrated circuit based on the power obtained from the external electronic device.

10. The method of claim 9, further comprising renewing the first full-charging voltage value of the first battery stored in the memory based on an accumulated charging charge amount of the first battery, when it is identified that the first battery is fully charged.

11. The method of claim 10, wherein the renewing the first full-charging voltage value of the first battery comprises renewing the first full-charging voltage value of the first battery stored in the memory, after the accumulated charging charge amount of the first battery exceeds a configured accumulated charging charge amount.

12. The method of claim 9, further comprising electrically disconnecting the first battery from the power management integrated circuit and electrically connecting the second battery to the power management integrated circuit, when it is identified that the first battery is fully charged.

13. The method of claim 12, further comprising renewing the second full-charging voltage value of the second battery stored in the memory based on an accumulated charging charge amount of the second battery, when it is identified that the second battery is fully charged.

14. The method of claim 9, further comprising:
   detecting whether the electronic device is electrically disconnected from the external electronic device for supplying power to the first battery or the second battery;
   in response to detecting that the electronic device is disconnected from the external electronic device, identifying a state of the first battery electrically connected to the power management integrated circuit; and
   when it is identified that the first battery is fully discharged, electrically disconnecting the first battery from the power management integrated circuit and electrically connecting the second battery to the power management integrated circuit.

15. An electronic device comprising:
a first battery;
a second battery;
a memory configured to store information on a first full-charging voltage value of the first battery when fully charged and a second full-charging voltage value of the second battery when fully charged, the second full-charging voltage value is lower than the first full-charging voltage value;
a power management integrated circuit configured to be electrically connected to the first battery through a first current limiting circuit and to be electrically connected to the second battery through a second current limiting circuit; and
a processor, wherein the processor is configured to:
while supplying power to the electronic device by using power supplied from at least one battery of the first battery or the second battery, detect whether the electronic device is connected to an external electronic device;
in response to the detection of the electronic device connected to the external electronic device, supply, based on a first proportion of the first full-charging voltage value to the first full-charging voltage value and the second full-charging voltage value, a part of power obtained from the external electronic device to the first battery; and
in response to the detection, concurrently supply, based on a second proportion of the second full-charging voltage value to the first full-charging voltage value and the second full-charging voltage value, a remainder of the power obtained from the external electronic device to the second battery.

16. The electronic device of claim 15, wherein the processor is configured to renew the first full-charging voltage value of the first battery stored in the memory based on an accumulated charging charge amount of the first battery, when it is identified that the first battery is fully charged.

17. The electronic device of claim 16, wherein the processor is further configured to renew the first full-charging voltage value of the first battery stored in the memory, after the accumulated charging charge amount of the first battery exceeds a configured accumulated charging charge amount.

18. The electronic device of claim 15, wherein the processor is further configured to control the power management integrated circuit so as to electrically disconnect the first battery from the power management integrated circuit, when it is identified that the first battery is fully charged.

19. The electronic device of claim 18, wherein the processor is further configured to renew the second full-charging voltage value of the second battery stored in the memory based on an accumulated charging charge amount of the second battery, when it is identified that the second battery is fully charged.

20. The electronic device of claim 15, wherein the processor is further configured to:
detect whether the electronic device is electrically disconnected from the external electronic device;
in response to detecting that the electronic device is disconnected from the external electronic device, supply, based on the first proportion of the first full-charging voltage value to the first full-charging voltage value and the second full-charging voltage value, first power from the first battery to the power management integrated circuit; and
in response to detecting that the electronic device is disconnected from the external electronic device, supply, based on the second proportion of the second full-charging voltage value to the first full-charging voltage value and the second full-charging voltage value, second power from the second battery to the power management integrated circuit,
wherein a ratio between the first power and the second power is configured to correspond to the ratio between the first full-charging voltage value and the second full-charging voltage value.

* * * * *